US010763915B2

(12) United States Patent
Sun et al.

(10) Patent No.: US 10,763,915 B2
(45) Date of Patent: Sep. 1, 2020

(54) UPSTREAM ECHO CANCELLATION IN FULL DUPLEX COMMUNICATIONS

(71) Applicant: Futurewei Technologies, Inc., Plano, TX (US)

(72) Inventors: Yanbin Sun, Shenzhen (CN); James Jeng Chen, Corona, CA (US); Tao Ouyang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/988,746

(22) Filed: May 24, 2018

(65) Prior Publication Data

US 2018/0343033 A1 Nov. 29, 2018

Related U.S. Application Data

(60) Provisional application No. 62/511,584, filed on May 26, 2017.

(51) Int. Cl.
*H04B 3/487* (2015.01)
*H04L 5/14* (2006.01)
(Continued)

(52) U.S. Cl.
CPC ............ *H04B 3/487* (2015.01); *H04B 3/238* (2013.01); *H04L 5/006* (2013.01); *H04L 5/0053* (2013.01); *H04L 5/143* (2013.01); *H04L 5/1461* (2013.01)

(58) Field of Classification Search
CPC ....... H04B 3/487; H04B 3/238; H04L 5/0053; H04L 5/006; H04L 5/143; H04L 5/1461
(Continued)

(56) References Cited

U.S. PATENT DOCUMENTS 5,970,088 A 10/1999 Chen et al.
6,510,152 B1 1/2003 Gerszberg et al.
(Continued)

OTHER PUBLICATIONS

"Data-Over-Cable Service Interface Specification DOCSIS® 3.1", MAC and Upper Layer Protocols Interface Specification, CM-SP-MULPIv3.1-I14-180130, Copyright 2013-2018 Cable Television Laboratories, Inc., (Jan. 30, 2018), 901 pgs.
(Continued)

*Primary Examiner* — Obaidul Huq
(74) *Attorney, Agent, or Firm* — Schwegman Lundberg & Woessner, P.A.

(57) ABSTRACT

An echo cancellation training method in a cable modem is provided, comprising receiving an echo cancellation service ID (EC SID) assigned for echo cancellation training, the cable modem receiving the EC SID from a cable head end in an information element (IE) in a map (MAP or P-MAP) defining a time and frequency of upstream transmission opportunities for the cable modem, the EC SID establishing when the cable modem may perform the echo cancellation training in a downstream channel allocated to the cable modem, transmitting an echo cancellation test signal upstream to the cable head end via an upstream channel allocated to the cable modem and in a time slot specified by the received EC SID in the map, and measuring noise in one or more downstream channels allocated to the cable modem, with the noise resulting from the transmission of the echo cancellation test signal on the upstream channel.

19 Claims, 13 Drawing Sheets

(51) Int. Cl.
    *H04B 3/23* (2006.01)
    *H04L 5/00* (2006.01)
(58) Field of Classification Search
    USPC .................................................. 370/241, 252
    See application file for complete search history.

(56) References Cited

U.S. PATENT DOCUMENTS

| | | | |
|---|---|---|---|
| 6,633,604 B1 * | 10/2003 | Demjanenko | H04L 5/1438 375/222 |
| 10,523,271 B2 | 12/2019 | Sun et al. | |
| 2018/0287659 A1 * | 10/2018 | Ramesh | H04B 3/23 |
| 2018/0294941 A1 | 10/2018 | Chapman et al. | |
| 2018/0343031 A1 | 11/2018 | Yagil et al. | |

OTHER PUBLICATIONS

"FDX DOCSIS®: System Architecture Overview", Copyright 2016 Cable Television Laboratories, Inc., (Jul. 2016), 13 pgs.

* cited by examiner

| IE NAME 1 | INTERVAL USAGE CODE (IUC) (4 BITS) | SID (14 BITS) | MINISLOT OFFSET (14 BITS) |
|---|---|---|---|
| REQUEST6 | 0 | ANY | STARTING OFFSET OF REQ REGION |
| REQUEST_2 | 1 | WELL-KNOWN MULTICAST | STARTING OFFSET OF REQ_2 REGION |
| INITIAL MAINTENANCE2 | 2 | BROADCAST OR UNICAST | STARTING OFFSET OF MAINT. REGION (USED IN INITIAL OR PERIODIC RANGING) |
| STATION MAINTENANCE | 3 | UNICAST3 | STARTING OFFSET OF MAINT. REGION (USED IN PERIODIC RANGING) |
| DATA PROFILE IUC5 | 4 | UNICAST | STARTING OFFSET OF DATA GRANT ASSIGNMENT |
| DATA PROFILE IUC6 | 5 | UNICAST | STARTING OFFSET OF DATA GRANT ASSIGNMENT |
| NULL IE | 6 | ZERO | ENDING OFFSET OF THE PREVIOUS GRANT, USED TO BOUND THE LENGTH OF THE LAST ACTUAL INTERVAL ALLOCATION |
| RESERVED | 7 | UNICAST | RESERVED |
| DATA PROFILE IUC9 | 8 | UNICAST | STARTING OFFSET OF DATA GRANT ASSIGNMENT; IF INFERRED LENGTH = 0 THEN IT IS A DATA GRANT PENDING |
| DATA PROFILE IUC10 | 9 | UNICAST | |
| DATA PROFILE IUC11 | 10 | UNICAST | |
| DATA PROFILE IUC12 | 11 | UNICAST | |
| DATA PROFILE IUC13 | 12 | UNICAST | |
| RESERVED | 13 | ANY | RESERVED |
| EXPANSION | 14 | EXPANDED IUC | # OF ADDITIONAL 32-BIT WORDS IN THIS IE |

FIG. 9A

| IE NAME 1 | INTERVAL USAGE CODE (IUC) (4 BITS) | SID (14BITS) | MINISLOT OFFSET (14BITS) |
|---|---|---|---|
| REQUEST6 | 0 | ANY | STARTING OFFSET OF REQ REGION |
| REQUEST_2 | 1 | WELL-KNOWN MULTICAST | STARTING OFFSET OF REQ_2 REGION |
| INITIAL MAINTENANCE2 | 2 | BROADCAST OR UNICAST | STARTING OFFSET OF MAINT. REGION (USED IN INITIAL OR PERIODIC RANGING) |
| STATION MAINTENANCE | 3 | UNICAST3 | STARTING OFFSET OF MAINT. REGION (USED IN PERIODIC RANGING) |
| DATA PROFILE IUC5 | 4 | UNICAST | STARTING OFFSET OF DATA GRANT ASSIGNMENT |
| DATA PROFILE IUC6 | 5 | UNICAST | STARTING OFFSET OF DATA GRANT ASSIGNMENT |
| NULL IE | 6 | ZERO | ENDING OFFSET OF THE PREVIOUS GRANT, USED TO BOUND THE LENGTH OF THE LAST ACTUAL INTERVAL ALLOCATION |
| RESERVED | 7 | UNICAST | RESERVED |
| DATA PROFILE IUC9 | 8 | UNICAST | |
| DATA PROFILE IUC10 | 9 | UNICAST | |
| DATA PROFILE IUC11 | 10 | UNICAST | STARTING OFFSET OF DATA GRANT ASSIGNMENT; IF INFERRED LENGTH = 0 THEN IT IS A DATA GRANT PENDING |
| DATA PROFILE IUC12 | 11 | UNICAST | |
| DATA PROFILE IUC13 | 12 | UNICAST | |
| RESERVED | 13 | ANY | RESERVED |
| EXPANSION | 14 | EXPANDED IUC | # OF ADDITIONAL 32-BIT WORDS IN THIS IE |
| EC TRAINING | 15 | 6C SID | EC TRAINING CHANNEL ALLOCATION |

FIG. 9B

UPSTREAM ECHO CANCELLATION IN FULL DUPLEX COMMUNICATIONS

CROSS-REFERENCE TO RELATED APPLICATIONS

The present application claims priority to U.S. Provisional Patent Application No. 62/511,584, filed May 26, 2017. The contents of that application are incorporated herein by reference.

BACKGROUND

Data Over Cable Service Interface Specification (DOCSIS) is a communication protocol used in cable networks to enable a headend cable mode termination system (CMTS), and customer premises equipment (CPE) including a cable modem (CM), to communicate with each other over the Internet and over a traditional cable plant. DOCSIS 3.1 uses orthogonal frequency division with multiple access (OFDMA) for upstream transmissions from the CM to the CMTS and orthogonal frequency division multiplex (OFDM) for downstream transmission from the CMTS to the CM where upstream and downstream channels are allocated differently in the RF communication spectrum. In OFDMA upstream transmission, a given CM looks for its time/frequency defined in a DOCSIS MAP that is sent from the CMTS to the CM to define the time/frequency of the CM's upstream transmission opportunities.

Recently, cable operators decided to increase the spectrum capacity to use the downstream channels for upstream transmission using a technique called Full Duplex DOCSIS. Full Duplex DOCSIS takes 3 downstream channels from the downstream spectrum and uses them for upstream channels if the CM (or a group of CMs) are not using the downstream channels. However, since a given CM may use one of the downstream channels as an upstream channel, the upstream channel may cause "noise" or "echo" that affects other downstream channels. A system and method is desired that enables the CM to measure such "noise" or "echo" effects in the upstream channel and offset these effects using echo cancellation techniques that minimize the adverse impact to adjacent downstream channels.

SUMMARY

Various examples are now described to introduce a selection of concepts in a simplified form that are further described below in the Detailed. Description. The Summary is not intended to identify key or essential features of the claimed subject matter, nor is it intended to be used to limit the scope of the claimed subject matter.

According to one aspect of the present disclosure, there is provided an echo cancellation training method in a cable modem, comprising: receiving an echo cancellation service ID (EC SID) assigned for echo cancellation training, the cable modem receiving the EC SID from a cable head end in an information element (IE) in a map (MAP or P-MAP) defining a time and frequency of upstream transmission opportunities for the cable modem, the EC SID establishing when the cable modem may perform the echo cancellation training in a downstream channel allocated to the cable modem; transmitting an echo cancellation test signal upstream to the cable head end via an upstream channel allocated to the cable modem and in a time slot specified by the received EC SID in the map; and measuring noise in one or more downstream channels allocated to the cable modem, with the noise resulting from the transmission of the echo cancellation test signal on the upstream channel.

According to another aspect of the present disclosure, there is provided a cable modem, comprising: a memory storage comprising instructions; and a processor in communication with the memory, wherein the processor executes the instructions to: receive an echo cancellation service ID (EC SID) assigned for echo cancellation training, the EC SID being received from a cable head end in an information element (IE) in a map (MAP or P-MAP) defining a time and frequency of upstream transmission opportunities for the cable modem, the EC SID establishing when the cable modem may perform the echo cancellation training in a downstream channel allocated to the cable modem; transmit an echo cancellation test signal upstream to the cable head end via an upstream channel allocated to the cable modem and in a time slot specified by the received EC SID in the map; and measure noise in one or more downstream channels allocated to the cable modem, with the noise resulting from the transmission of the echo cancellation test signal on the upstream channel.

According to another aspect of the present disclosure, there is provided a non-transitory computer-readable media storing computer instructions implementing full-duplex communications in a cable modem, that when executed by one or more processors, cause the one or more processors to perform the steps of: receiving an echo cancellation service ID (EC SID) assigned for echo cancellation training, the EC SID being received from a cable head end, the EC SID being received in an information element (IE) in a map (MAP or P-MAP) defining a time and frequency of upstream transmission opportunities for the cable modem, the EC SID establishing when the cable modem may perform the echo cancellation training in a downstream channel allocated to the cable modem transmitting an echo cancellation test signal upstream to the cable head end via an upstream channel allocated to the cable modem and in a time slot specified by the received EC SID in the map; and measuring noise in one or more downstream channels allocated to the cable modem, with the noise resulting from the transmission of the echo cancellation test signal on the upstream channel.

Optionally, in any of the preceding embodiments, the EC SID is provided in a reserved information element (IE) entry of the MAP or the P-MAP.

Optionally, in any of the preceding embodiments, the EC SID is provided in a dedicated information element (IE) entry of the MAP or the P-MAP.

Optionally, in any of the preceding embodiments, the cable modem extracts the EC SID from the MAP or the P-MAP to identify the time slot for the transmission of the echo cancellation test signal.

Optionally, in any of the preceding embodiments, the cable modem further receives a resource block assignment (RBA) assigning the upstream channel to the cable modem.

Optionally, in any of the preceding embodiments, the cable modem further receives a resource block assignment (RBA) assigning the one or more downstream channels to the cable modem.

Optionally, in any of the preceding embodiments, the cable modem receives a same RBA as other cable modems in a transmission group.

Optionally, in any of the preceding embodiments, the cable modem is capable of full duplex communications over a transmission line to a cable head end, wherein the transmission line has at least one downstream communication channel and at least one upstream communication channel allocated to the cable modem.

Any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIG. 9A is an allocation map without an information element for echo cancellation training signals.

FIG. 9B is an allocation map with a new echo cancellation training signal information element.

DETAILED DESCRIPTION

Figure 1:
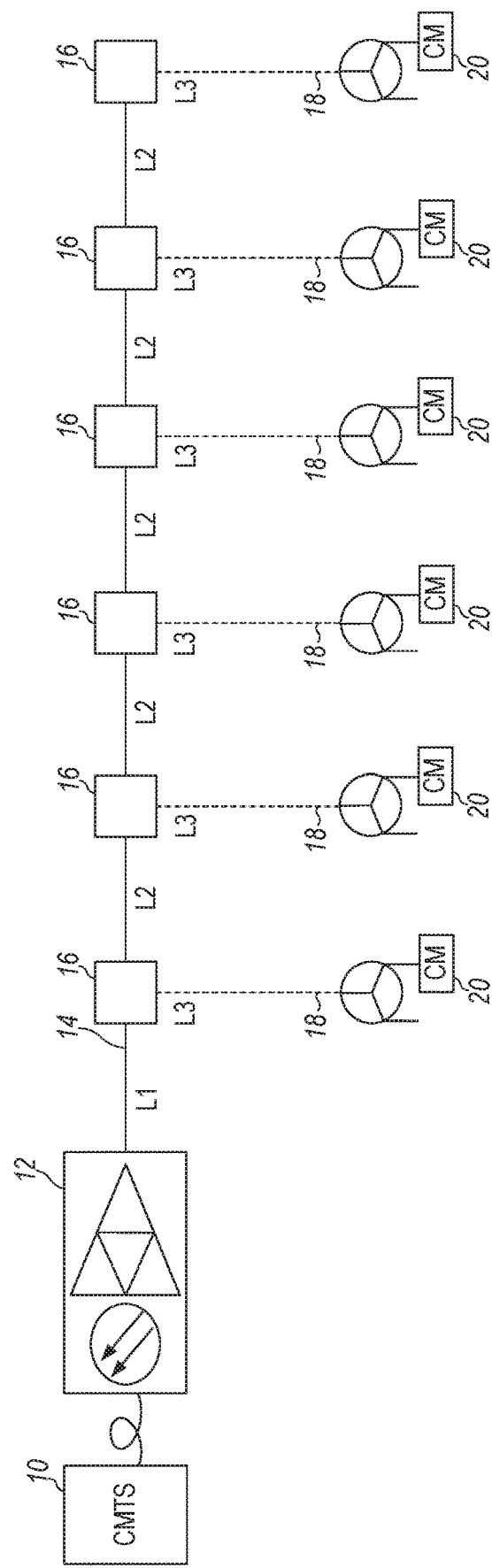
FIG. 1 illustrates a typical cable plant through which a cable headend's cable modem termination system (CMTS) communicates with a plurality of cable modems (CMs) in a sample embodiment.

It should be understood at the outset that although an illustrative implementation of one or more embodiments are provided below, the disclosed systems and/or methods described with respect to FIGS. 1-14 may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As noted above, since a given CM may use one of the downstream channels as an upstream channel, the upstream channel may cause "noise" or "echo" that affects other downstream channels. A system and method is provided that enables the CM to measure such "noise" or "echo" effects by sending upstream training signals so that any such "noise" or "echo" effects may be measured and offset using echo cancellation techniques that minimize the adverse impact to adjacent downstream channels. Since the DOCSIS communication protocol does not allocate bandwidth for transmission of echo cancellation training signals and does not include an information element that may be used for transmission of Full Duplex DOCSIS echo cancellation training signals, the techniques described herein modify the DOCSIS communication protocol to enable CMs to transmit echo cancellation training signals so that any noise or echo effects to an adjacent downstream channel may be minimized using echo cancellation techniques.

In DOCSIS MAP/P-MAP messages under the current DOCSIS standard, there is no IE (Information Element) to be used for transmission of full duplex EC training signals. Therefore, a new IE is defined for providing EC training signal transmission opportunities for the full duplex CMs for transmission of the EC training signal in a specific upstream channel.

In sample embodiments, the systems and methods described herein modify the Data Over Cable Service Interface Specification (DOCSIS) communication protocol to enable cable modems (CMs) to transmit echo cancellation training signals, which are signals inserted into the upstream channel and then muted or attenuated in the downstream channel, by providing a service ID (SID) or Echo Cancellation SID (EC SID) that can be used when the CM is to send the echo cancellation training signal for measurement. The new SID is inserted into the DOCSIS MAP, which is a "regular" bandwidth allocation map for the CM's data transmission, or into a Probe-MAP (P-MAP), which is used when the CM sends probe symbols as part of the CM initiation and registration process. In a first embodiment of the SID, a new field is created in the DOCSIS MAP or P-MAP with the new SID to provide a slot for information element entry. In a second embodiment of the SID, the SID uses an existing information element entry in the DOCSIS MAP or P-MAP that can be used for sending the upstream echo cancellation training signals and for measuring in the downstream direction. As so modified, the DOCSIS MAP or P-MAP includes an information element that permits each CM to allocate the echo cancellation training signal to be sent in the upstream direction and measuring the echo in the downstream direction.

For Full Duplex DOCSIS, also known as FDX DOCSIS, the headend cable modem termination system (CMTS) may communicate with the CM using a resource block assignment (RBA) to tell the CM which three of the downstream channels will be used for upstream transmission. For a given transmission group on a given cable connecting the members of the transmission group, there may be a group of CMs assigned with the same RBA and others with a different RBA. For a group of CMs which has been assigned a downstream channel to be used for upstream transmission, each CM may use the echo cancellation testing signals to test the noise and signal ratio which may cause interference to other downstream channels which the CM is operating on. Thus, for testing the signal leakage (or to perform the CM's own echo cancellation) from the upstream channel to the downstream channel, the CM will use an allocated time slot in the DOCSIS MAP or P-MAP to send the echo cancellation test signal and measure the impact in its own downstream channel. A self-echo cancellation scheme may be implemented by the CM by creating a new SID inside the DOCSIS MAP or P-MAP that enables the CM to perform this function.

FIG. 1 illustrates a typical cable plant through which a cable headend's CMTS 10 communicates with a plurality of CMs 20 in a sample embodiment. As shown, in a conventional configuration the CMTS 10 communicates through optical fibers to an optical fiber node 12 that terminates coaxial trunk cable 14. As illustrated, the coaxial trunk cable 14 is a multi-drop communication line including a number of taps 16 for dropping cables 18 that connect to respective CMs 20 at customer premises. In sample embodiments described herein, the cable plant illustrated in FIG. 1 is modified to provide upstream and downstream communications between the CMs 20 and the CMTS 10. In such embodiments, the CMs 20 have full duplex capability. In further embodiments described herein, the full duplex CMs 20 further have an added echo cancellation (EC) circuit and EC software algorithm (FIG. 6) to enable the CM 20 to perform its own echo cancellation scheme when a downstream channel is used for upstream transmission as in full duplex DOCSIS applications. As will be explained in more detail below, an EC service identifier (SID) entry in the DOCSIS MAP or P-MAP sent from the CMTS 10 to the CMs 20 will be used to establish when each CM 20 may perform echo cancellation training in the downstream channel.

Under current DOCSIS standards, the 5 MHz to 204 MHz band is available for upstream communications while 108 MHz to 1794 MHz is allocated for downstream communications. Full Duplex DOCSIS allows the same legacy spectrum to be used for upstream and downstream communications and occupies a subset of the radiofrequency (RF) spectrum starting at 108 MHz and can extend up to 684 MHz. The full duplex spectrum is divided into up to 3 sub-bands of 192 MHz each. Each sub-band contains one orthogonal frequency-division multiplexed (OFDM) downstream channel and one or two upstream orthogonal frequency-division multiple access (OFDMA) channels. From the perspective of CMTS 10, data traffic will be simultaneously flowing upstream and downstream in each sub-band. However, from the perspective of CM 20, the spectrum will still appear to be frequency-division multiplexed, as at any point in time a CM 20 is either transmitting or receiving on a channel. Each CM 20 will use a sub-band only for upstream or downstream operation at a given time, but one set of CMs 20 can use the sub-band for upstream at the same time that a different set of CMs 2C) has been assigned to use that sub-band for downstream. Thus, while a CM 20 is receiving on a channel, other CMs 20 may be transmitting on the same channel. This creates the possibility of data interference in a given sub-band. While intelligent scheduling and interference cancellation may be used at the CMTS 10 to enable such transmissions, data interference remains an issue for upstream transmission in downstream channels.

To address the issue of possible data interference, each full duplex Transmission Group (TG) is given a Resource Block Assignment (RBA), which assigns the direction of traffic in each sub-band for that TG. A TG can use some sub-bands in the upstream direction while using other sub-bands in the downstream direction. While a TG can only use a sub-band in one direction at a given time, the RBA for a TG can be changed, allowing the direction of traffic for that TG in the sub-band to be changed. The CMTS 10 coordinates the change of the RBA to assure that traffic in one direction is stopped before starting traffic in the opposite direction, in order to prevent interference.

Once a full duplex DOCSIS capable CM 20 is operational and before it can transmit or receive within the occupied full duplex band allocated by the RBA, it is ordered to proceed through full duplex-specific CM initialization under direction of the CMTS 10. The CMTS 10 initiates full duplex band operations for a full duplex DOCSIS capable CM 20 at some point in time after registration. The CM 20 and the CMTS 10 complete a sounding procedure and the CM 20 is assigned a TG and a current RBA. The CM 20 then acquires the full duplex downstream and upstream channels, and is ready for echo cancellation training.

Echo cancellation is used to improve the full duplex CM 20 receiver performance by cancelling Adjacent Leakage Interference (ALI) and Adjacent Channel Interference (ACI) resulting from upstream transmissions. The CM 20 trains its echo canceller for each downstream channel in each A, with each RBA including upstream and downstream directions.

There are two phases to echo cancellation training: initial and periodic. Initial EC training is used to initially train the echo canceller for a given RBA. Once the CM 20 has trained for a given RBA, periodic EC training is used to keep the echo canceller of the CM 20 working optimally by applying self-interference cancellation and other optimization techniques. During periodic EC training, the CM 20 maintains each downstream channel (allocated for upstream transmission by the RBA) using EC training.

In sample embodiments, DBC (Dynamic Bonding Change) messaging is used to add full duplex channels to the CM's RCS (Receive Channel Set) and TCS (Transmit Channel Set), and EC training STDs are assigned for each upstream full duplex channel. Once the DBC assignment is complete and all necessary full duplex channels have been added to the CM's RCS and TCS, the DBC-ACID includes a TLV (Type/Length/Value) signifying that the CM 20 is ready for EC training on those channels. The CM 20 then sends to the CMTS 10 an ECT-REQ with the necessary parameters. An EC training SW is defined for each upstream channel and is assigned to the CM 20 in the DBC process. The CM 20 regularly processes the P-MAPs and looks for allocations to the EC training SID.

The periodic EC training allocations to the CM 20 may be 1-2 symbols long, again using EC training probe allocations. The CMTS 10 allocates the EC training P-information elements (P-IEs) in a P-MAP message to the allocated EC training SID. When present, the TLV (Type/Length/Value) provides a SID value to be used by the full duplex CM 20 when responding to EC training allocations for this upstream full duplex channel. The CMTS 10 is allowed to assign the EC training SID a value used on an SID cluster for this upstream channel or the same value as an EC testing SID for this upstream channel. CMTS 10 includes this TLV if the upstream channel action is Add, Change, or Replace, and the upstream channel is a full duplex channel included in the full duplex transmit channel set for the CMTS 10.

For full duplex DOCSIS operation, the CMTS 10 allocates bandwidth for one or more upstream channels. Bandwidth allocated to one CM 20 may be allocated across multiple channels upon which the CM 20 can transmit. An upstream channel is modeled as a stream of mini-slots. The CMTS 10 generates the time reference for identifying these slots. The CMTS 10 also controls access to these slots by the CMs 20. For example, the CMTS 10 may grant some number of contiguous slots to a CM 20 for it to transmit a protocol data unit (PDU). The CM 20 times its transmission so that the CMTS 10 receives the transmission from CM 20 in the time reference specified. The elements of the protocol used in requesting, granting, and using upstream bandwidth are described herein. The basic mechanism for assigning bandwidth management is the allocation map (MAP).

The DOCSIS allocation MAP is a media access control (MAC) management message which is transmitted by the CMTS 10 on the downstream channel and which describes, for some interval, the uses of the upstream mini-slots. A given MAP may describe some slots as grants in which particular CMs 20 may transmit data, other slots as available for contention transmission, and other slots as an opportunity for new CMs to join the link. The CMTS 10 transmits allocation MAP PDUs on the downstream channel, defining the allowed usage of all mini-slots.

In sample embodiments, an EC training service identifier (SID) is defined for each upstream channel and is assigned to the CM 20 in the training process. The CM 20 regularly processes the P-MAPs (Probe MAPS) and looks for allocations to the EC training SID for each full duplex upstream channel in the current full duplex sub-band. Once the CM 20 successfully completes its initial EC training, it sends an ECT-REQ message to the CMTS 10 requesting periodic EC training parameters and informing the CMTS 10 that the echo cancellation has converged sufficiently. If the RBA switches to an RBA in which the CM 20 has not previously trained or if the previous EC training parameters are no longer valid, the CM 20 might desire to redo the initial EC training. Techniques for establishing the EC training intervals will be described below.

In full duplex DOCSIS, three of the legacy DOCSIS downstream channels may be used for either upstream or downstream transmission. The three sub-bands are allocated by the CMTS 10 for assignment of channel direction to be either an upstream or downstream direction. For this purpose, a Resource Block Assignment (RBA) message is transmitted by the CMTS 10 in order to report or change the resource block assignment for a DOCSIS full duplex Transmission Group (TG). A resource block (RB) represents a unique directional arrangement of one or multiple DS or US full duplex channels assigned to a TG. An RB may include a mix of DS or US channels.

Figure 2:
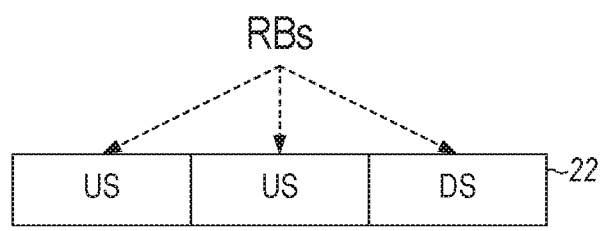
FIG. 2 illustrates a resource block (RB) assignment for three legacy DOCSIS downstream channels of a DOCSIS full duplex transmission group.

FIG. 2 illustrates a resource block (RB) assignment 22 for three legacy DOCSIS downstream channels of a DOCSIS full duplex transmission group. In this example, two of the channels are used for upstream (US) transmission and one channel is used for downstream (DS) transmission.

Figure 3:
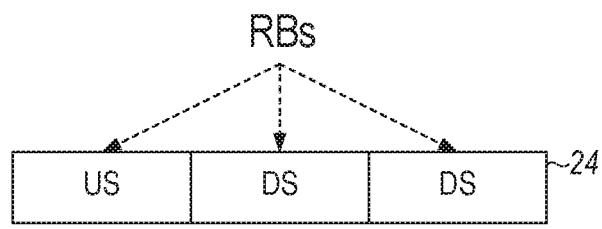
FIG. 3 illustrates another RB assignment for three legacy DOCSIS downstream channels of a DOCSIS full duplex transmission group.

FIG. 3 illustrates another RB assignment 24 for three legacy DOCSIS downstream channels of a DOCSIS full duplex transmission group. In this example, two of the channels are used for downstream (DS) transmission and one channel is used for upstream (US) transmission. A TG represents the set of CMs 20 sharing the same directional access to a full duplex channel.

Due to imperfect isolation, a pair of CMs can interfere with each other. If one CM is transmitting in the upstream direction in one sub-band while another CM is trying to receive in that same sub-band, energy from the first CM upstream transmission can leak into the downstream channel allocated to the second CM and prevent the second CM from successfully receiving downstream transmissions from the CMTS 10. A TG can be mapped to one or multiple Interference Groups (IGs), which are groups of CMs that would interfere with each other if they were allowed to transmit and receive at the same time in a sub-band. A sounding method can be used to identify the Interference Groups.

During operation, the CMTS 10 transmits RBA messages at periodic intervals to inform the CMs 20 of the RB assignment currently assigned to its full duplex TG. The CMTS 10 transmits an RBA message in order to change the Resource Block assigned to a Transmission Group at a specific future time. In a sample embodiment, the CM 20 is capable of storing eight future Resource Block Assignments with differing change counts.

Figure 4A:
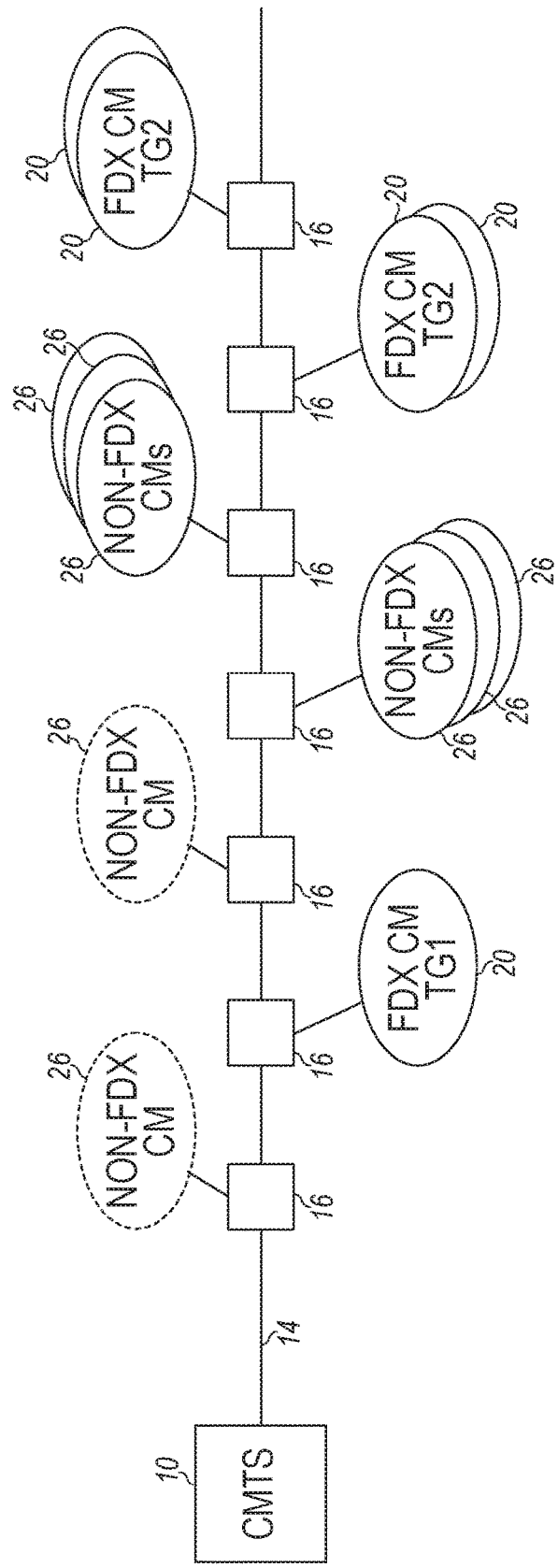
FIG. 4A and FIG. 4B illustrate spectrum allocation for full duplex DOCSIS.
Figure 4B:
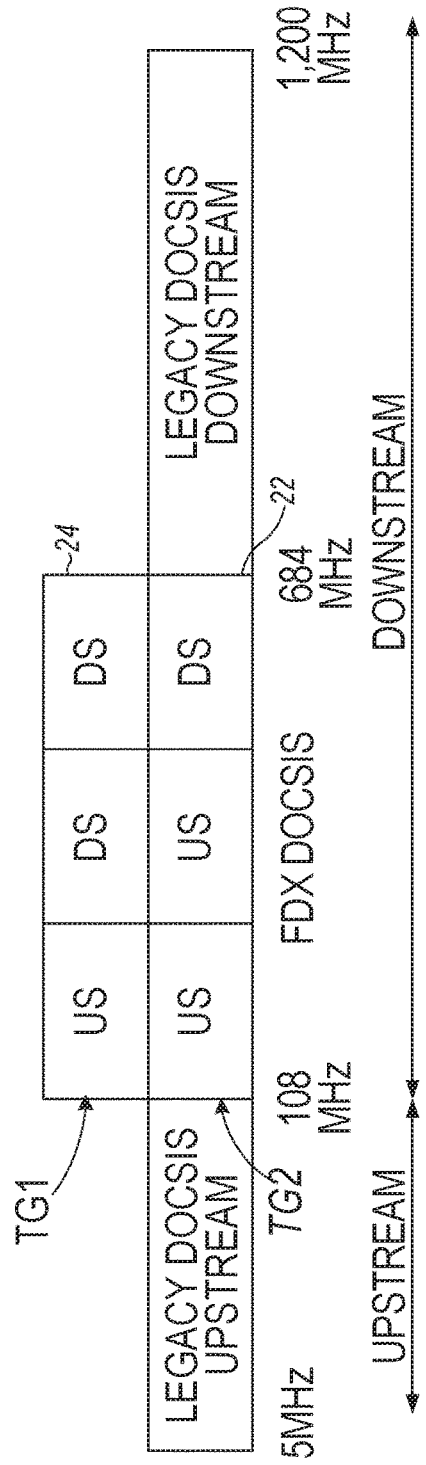

FIG. 4A and FIG. 4B illustrate spectrum allocation for full duplex DOCSIS, where full duplex capable CMs 20 are assigned to transmission groups TG1 and TG2. The assigned CMs 20 communicate with the CMTS 10 using the allocated sub-bands for upstream or downstream transmission based on the resource block assignment (RBA) for each transmission group. As illustrated in FIG. 4A, the taps 16 may connect one or more non-full duplex CMs 26 as well as one or more full duplex CMs 20 of TG1 and TG2. The three sub-bands in the legacy DOCSIS downstream spectrum then can be allocated to run full duplex DOCSIS as either upstream or downstream transmission based on the Resource Block Assignment (RBA).

In the example shown in FIG. 4B, a full duplex capable CM 20 is assigned as TG1 (Transmission Group 1) and another transmission group (TG2) is assigned to another group of full duplex CMs 20. The RBA assignment enables the full duplex CM 20 to use one of the 3 sub-band spectrums allocated in the legacy DOCSIS to run upstream based on the MAP provided, as will be explained in more detail below.

In order to minimize interference with the downstream channels, the CM desires to cancel the echo made by its transmissions. A CM echo cancellation training mechanism is desired. CM 20 transmits training signals in the upstream channel and the echo signal or signal leakage is measured in the downstream channel by the same CM 20. Multiple CMs 20 can be trained simultaneously, although in different frequency/time slots as set forth in the DOCSIS MAP or P-MAP. CMs 20 send the EC training signal in the upstream channel and measure the echo or signal leakage made by the EC training signal to the adjacent downstream channel.

Figure 5:
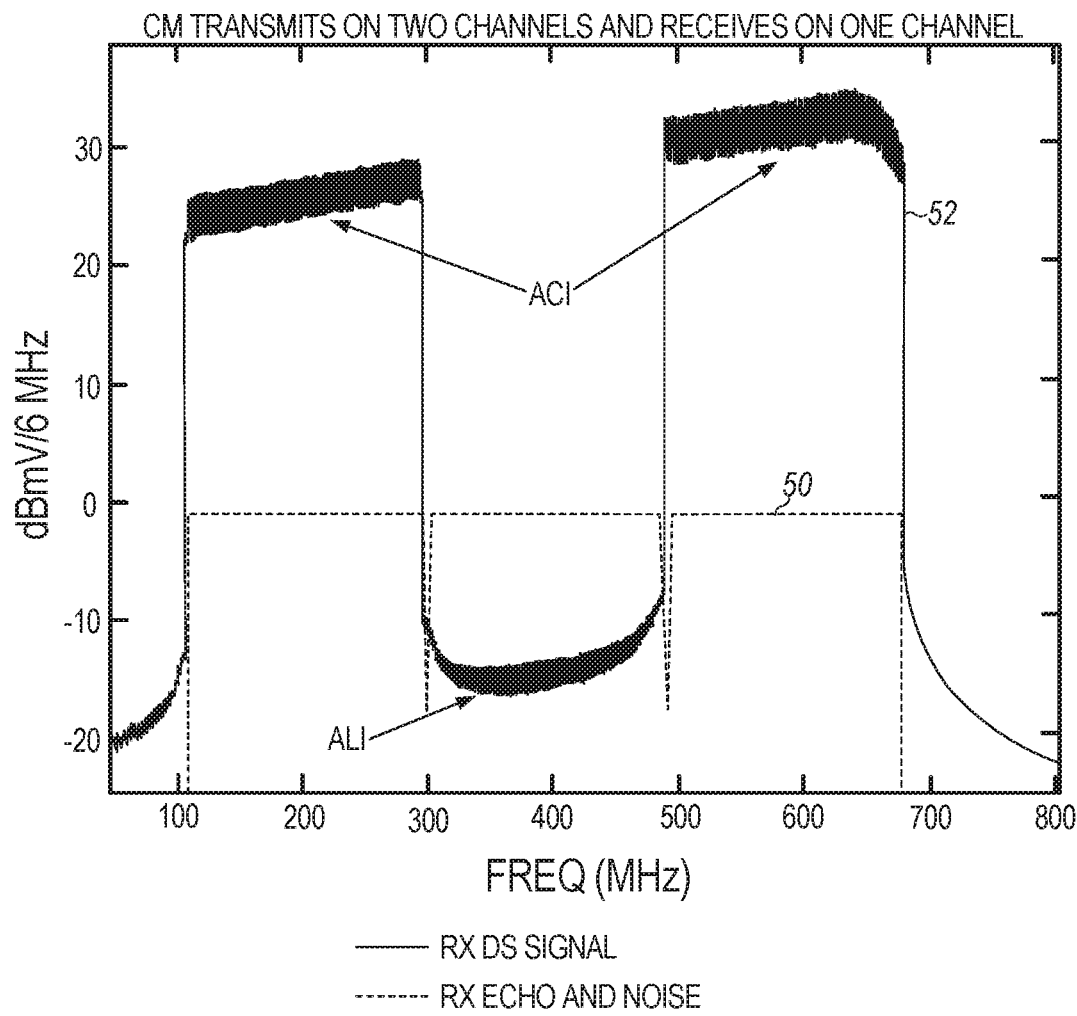
FIG. 5 illustrates an example CM transmission whereby the CM transmits on two channels and receives on one channel.

FIG. 5 illustrates an example CM transmission whereby the CM transmits on two channels and receives on one channel. This figure illustrates the impact of the adjacent channel interference (ACI) and adjacent leakage interference (ALI) on transmitted and received signals. In FIG. 5, the receiver data signal 50 is shown with the receiver echo and noise signal 52.

Figure 6:
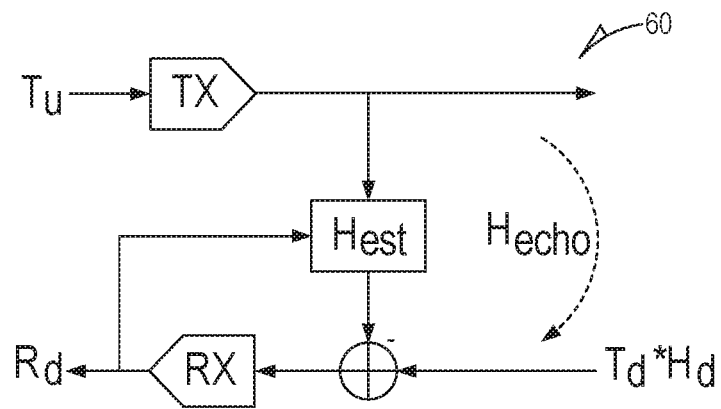
FIG. 6 is a diagram of an echo cancellation circuit for implementation at the CM.

FIG. 6 illustrates a sample block diagram of an echo cancellation circuit 60 for implementation at the CM 20, for cancelling the effects of ACI and ALI on the transmitted and received signals. Whether for ACI or ALI echo cancellation, the echo channel response should be estimated first. An upstream probe is a good reference signal for channel estimation. As illustrated, the upstream transmit signal $T_u$ is transmitted in the upstream band specified by the SBA, and the channel response of the echo ($H_{echo}$) is provided in the downstream transmit channel as $T_d*H_d$, where $T_d$ is the downstream transmit signal, $H_d$ is the channel response of the downstream channel, and "*" is a multiplier or convolution factor. The term $T_d*H_d$ in the downstream channel is summed with the channel response $H_{est}$ estimated in the echo cancellation circuit to provide the downstream receive signal $R_d=T_d*H_d+T_u*H_{echo}$, which is further provided to $H_{est}$ to estimate the channel response in the echo cancellation circuit. It will be appreciated that if the downstream signal is muted, the channel estimation becomes $H_{est} \approx H_{echo} = R'_d / T_u$, where "/" is a divider or inverse-convolution.

There are two ways to initiate EC training by a CM 20. First, a CM 20 may request training from the CMTS 10 (request and grant). Second, the CMTS 10 may initiate EC training by the CM 20. After the RBA provided by the CMTS 10 changes, the CM 20 may decide whether to perform EC training based on a look-up table designed in the CM 20, for example. Once EC training is initiated, the CM 20 sends an echo cancellation training signal.

Figures 7A, 7B:
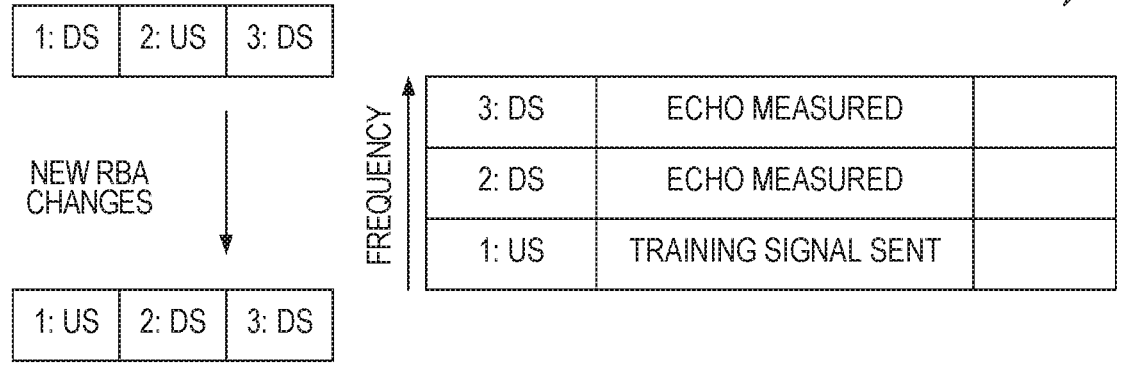
FIG. 7A is an RBA for sending the echo cancellation training signal in an upstream channel with downstream channels on either side.
FIG. 7B is an RBA for sending the echo cancellation training signal in an upstream channel adjacent to one of two downstream channels.

FIG. 7A is an RBA 70 for sending the echo cancellation training signal in an upstream channel, with downstream channels on either side where the echo or signal leakage is measured in the downstream channels.

FIG. 7B is an RBA 72 for sending the echo cancellation training signal in an upstream channel adjacent to one of two downstream channels. The echo or signal leakage is measured in the adjacent downstream channels. FIG. 78 shows RBA changes and EC training. For the EC training at the CM 20, the CM 20 sends a training signal on the upstream channel that is included in the RBA message sent from CMTS 10. For example, if a current RBA message has one upstream sub-band, the CM 20 sends the training signal in this upstream channel and measures the echo at one or both of the downstream channels. When a new RBA has been received, or if the RBA has been changed, as illustrated in FIG. 7B, the CM 20 performs EC training in a different upstream channel, based on the received new RBA.

The CMTS 10 allocates bandwidth for one or more upstream channels. Bandwidth allocated to one CM 20 may be allocated across multiple channels over which the CM 20 may transmit. An upstream channel is modeled as a stream of mini-slots. The CMTS 10 generates a time reference for identifying these slots. The CMTS 10 also controls access to these slots by the CMs 20. For example, the CMTS 10 may grant some number of contiguous slots to a CM 20 for it to transmit a protocol data unit (MU). The CM 20 times its transmission so that the CMTS 10 receives the CMs transmission in the time reference specified. As explained below, elements of the DOCSIS protocol are modified to permit requesting, granting, and using of the upstream bandwidth by the EC training signals from the CMs 20.

The basic mechanism for assigning bandwidth management is the allocation MAP or P-MAP (Probe MAP). The allocation MAP/P-MAP is a MAC Management Message which is transmitted by the CMTS 10 on the downstream channel and which describes, for some interval, the uses of the upstream mini-slots. A given MAP may describe some slots as grants in which particular CMs 20 may transmit data, other slots as available for contention transmission, and other slots as an opportunity for new CMs 20 to join the link. The CMTS 10 transmits allocation MAP/P-MAP PDUs on the downstream channel defining the allowed usage of all mini-slots.

Figure 8A:
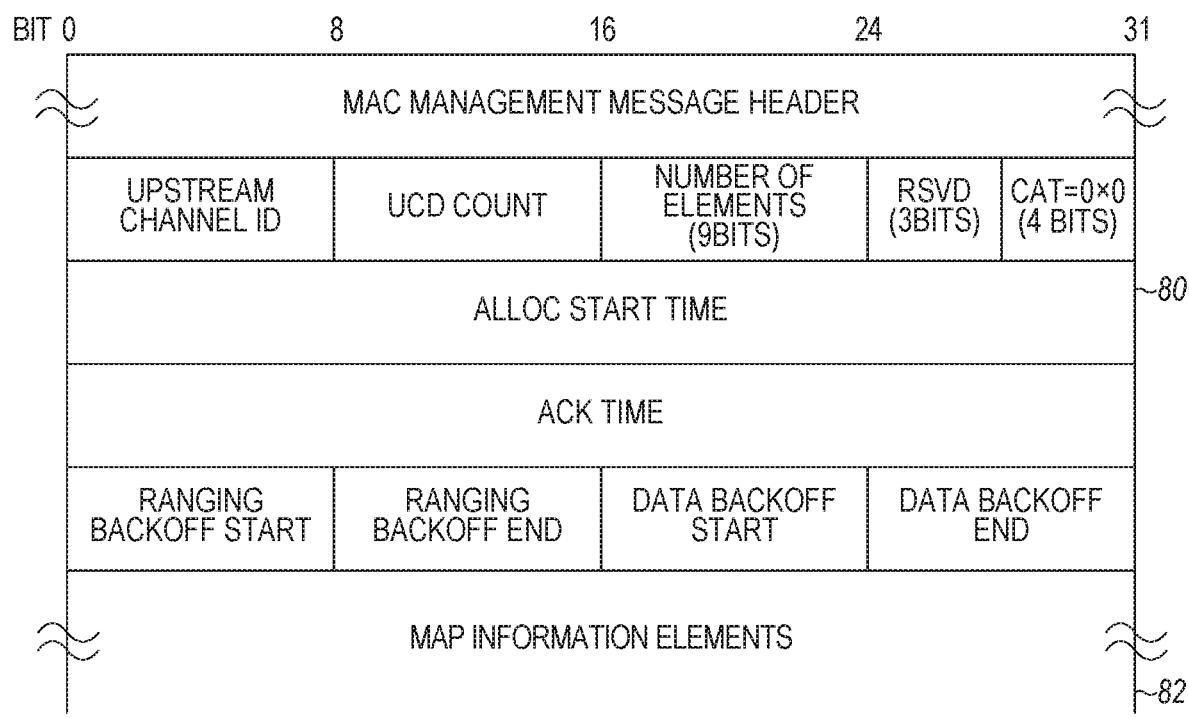
FIG. 8A illustrates a modified upstream bandwidth allocation map in a sample embodiment.

FIG. 8A is a modified upstream bandwidth allocation map (MAP) 80 in a sample embodiment. The MAP 80 is standard except for the inclusion of MAP information elements 82.

Figure 8B:
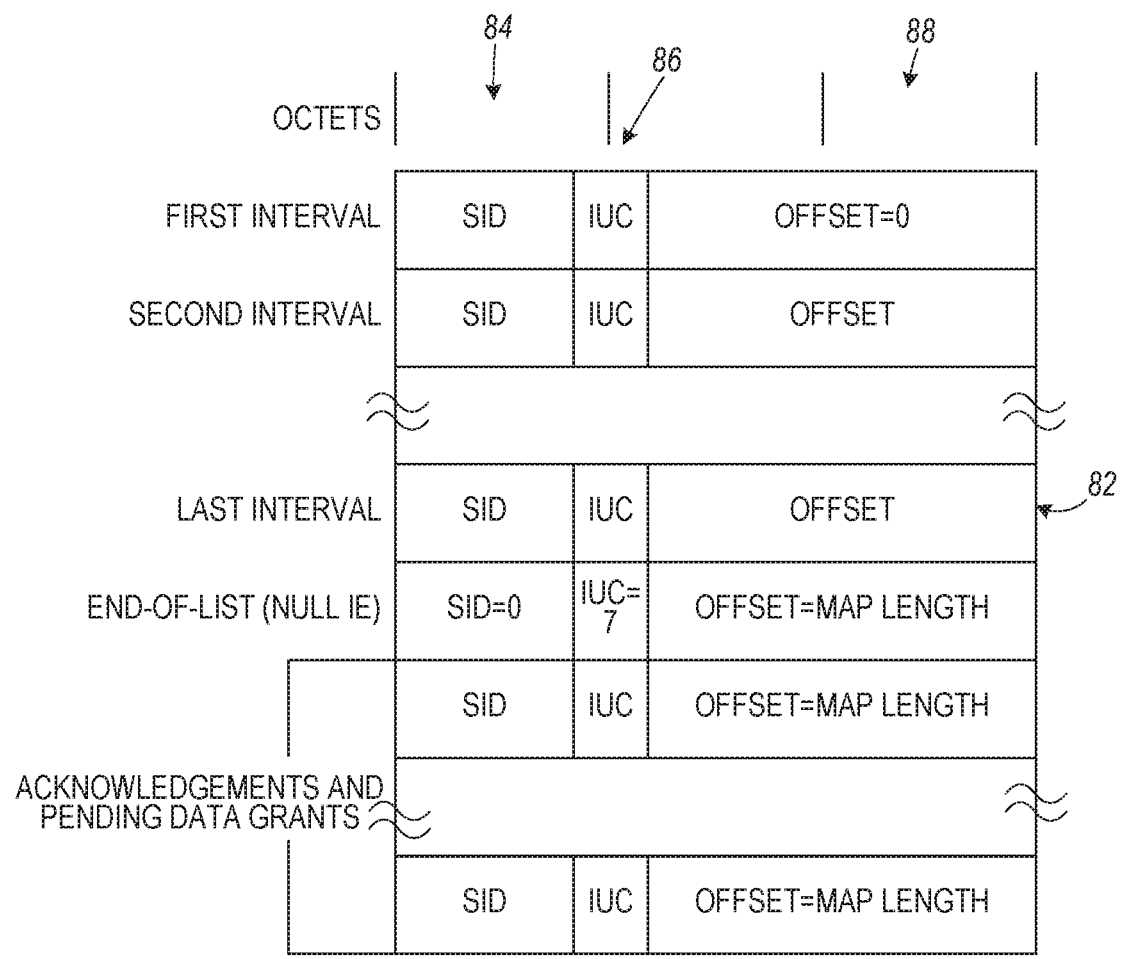
FIG. 8B illustrates an information element structure of the modified upstream allocation map.

FIG. 8B is an information element structure of the modified upstream allocation map of FIG. 8A. The modified upstream allocation map can be used for the MAP information elements 82 for allocating upstream bandwidth to the CMs for transmission of echo cancellation training signals in a sample embodiment. Mini-slot regions that are not allocated to any transmit opportunities are described by an information element (IE) 82 in the MAP 80 assigned to the NULL SID (0x0000). As illustrated in FIG. 8B, each IE includes a 14-bit Service ID (SID/Service Identifier) 84 which are the lower 14 bits of a 16-bit field, a 4-bit type code (IUC/Interval Usage Code) 86, and a 14-bit starting offset 88. Since all CMs 20 scan all IEs, the IEs are short and have a relatively fixed format. IEs within the MAP are strictly ordered by starting offset. For most purposes, the duration described by the IE is inferred by the difference between the IE's starting offset and that of the following IE. Thus, all CMs 20 in a transmit group see the same MAP but transmit in different mini-slots specified by the SID 84 for each CM 20.

The service identifier (SID) 84 identifies the flow direction and is assigned by the CMTS 10 (in addition to a service flow identifier) to an active or admitted upstream Service Flow. A CM 20 is not allowed to transmit on an upstream channel without a valid upstream bandwidth allocation provided by the DOCSIS MAP or P-MAP. If a MAP is missed due to error, the CM 20 is not allowed to transmit on the corresponding channel for the period covered by the MAP.

As noted above, the CMTS 10 grants the transmission opportunities for the EC training signals. However, in DOCSIS MAP/P-MAP messages under the current DOCSIS standard, there is no IE (Information Element) to be used for transmission of full duplex EC training signals. Therefore, a new IE is defined for the CMTS 10 to grant the EC training signal transmission opportunities for the full duplex CMs 20 for transmitting the EC training signal in a specific upstream channel. Two alternative methods for allowing the CM 20 to transmit training signals are provided.

In a first embodiment, a new EC service identifier (EC SID) is created and a current data Interval Usage Code (IUC) defined in a DOCSIS MAP or P-MAP is used. FIG. 9A is an allocation map 90 without an information element for echo cancellation training signals. In this example, the new EC SID uses a reserved IUC (such as IUC=7 or IUC=13) to transport the EC SID for providing a channel for EC training.

In a second embodiment, a new EC SID and a new EC IUC are created as part of the DOCSIS MAP or P-MAP. FIG. 9B is an allocation map 92 with a new echo cancellation training signal information element (IUC=15). The new cancellation training signal information element provides upstream bandwidth for echo cancellation training signals.

Figure 10A:
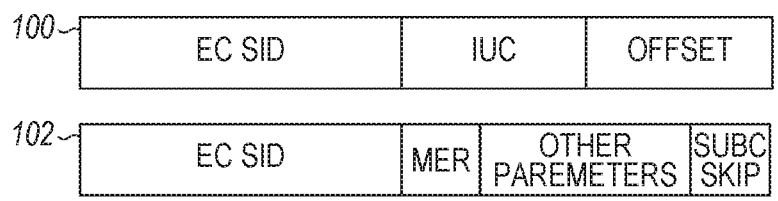
FIG. 10A illustrates sample echo cancellation information elements in an embodiment.

FIG. 10A illustrates sample echo cancellation information elements in an embodiment. The sample echo cancellation information elements are designed to use an existing IUC defined for the DOCSIS MAP or P-MAP to be placed in a DOCSIS MAP message 100 and a DOCSIS P-MAP message 102, where the DOCSIS MAP and DOCSIS P-MAP are not modified, as in the first method for the DOCSIS MAP of FIG. 9A.

Figure 10B:
FIG. 10B illustrates a sample echo cancellation information element in another embodiment.

FIG. 10B illustrates a sample echo cancellation information element in another embodiment. The sample echo cancellation information element is designed to be placed in a DOCSIS MAP or P-MAP message 104, where the DOCSIS MAP and DOCSIS P-MAP are modified as in FIG. 9B. This new EC training SID may be assigned to one or to multiple CMs 20, enabling one or multiple CMs 20 to transmit multiple EC training signals using the same upstream channel, in accordance with the SBA.

Figure 11:
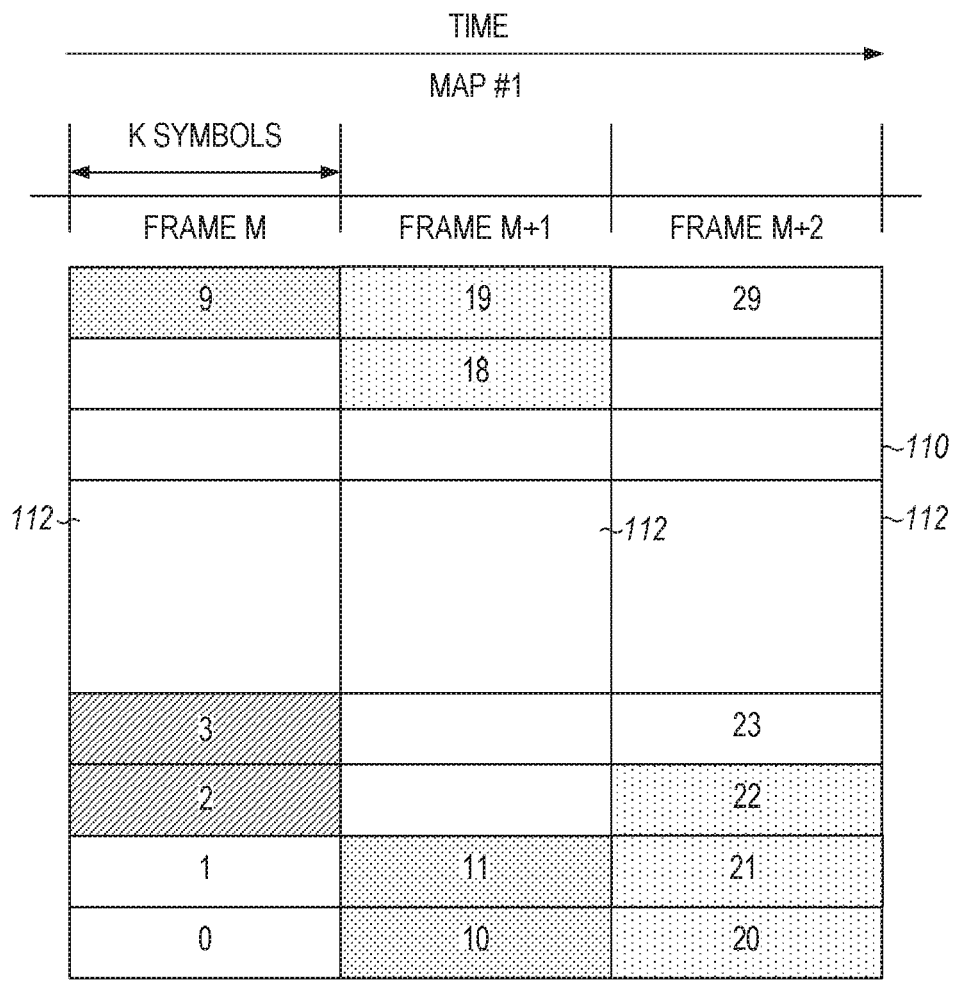
FIG. 11 illustrates a sample allocation in a DOCSIS OFDMA MAP using echo cancellation SIDs (EC SIDS) for sending echo cancellation training signals in a sample embodiment.

FIG. 11 illustrates a sample allocation in a DOCSIS OFDMA MAP 110 using echo cancellation SIDS for sending echo cancellation training signals in a sample embodiment. In this example, newly created EC SIDs are used for sending training signals in OFDMA by the full duplex CMs 20 during the allocated mini-slots. As illustrated at 112, mini-slots for the EC SU) are allocated in time slots 4-6, 16-16, and 24-26, respectively. Other traffic with different SIDS are transmitted in time slots 2-3, 9-11, and 18-22 as indicated.

Figure 12:
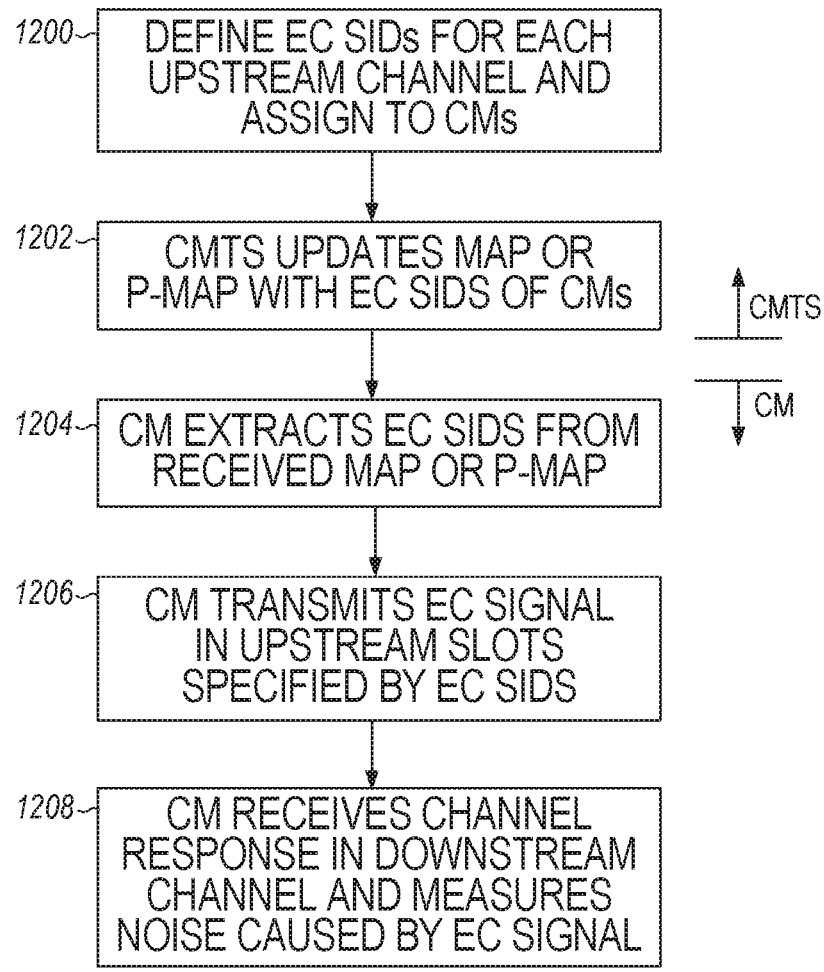
FIG. 12 is a flow chart of a method for enabling echo cancellation in an upstream channel of a DOCSIS downstream channel in a sample embodiment.

FIG. 12 is a flow chart of a method for enabling echo cancellation in an upstream channel of a DOCSIS downstream channel in a sample embodiment. The process described generally above is summarized in the steps of FIG. 12. At step 1200, the CMTS 10 defines the SIDS for each upstream channel and assigns the SIDS to the respective CMs 20. The CMTS 10 updates the MAP or P-MAP with the assigned SIDS for the CMs 20 at step 1202. Upon receipt of the revised MAP or P-MAP, the respective CMs 20 extract the SIDS from the received MAP or P-MAP at step 1204. When the CM 20 is ready for echo cancellation, the CM 20 transmits an EC signal in the upstream slot(s) specified by the SIDS at step 1206. The CM 20 then receives the channel response in the downstream channel and measures the impact of the EC signal on the downstream channel at step 1208. Appropriate adjustments in the upstream transmission may then be made as appropriate.

Figure 13:
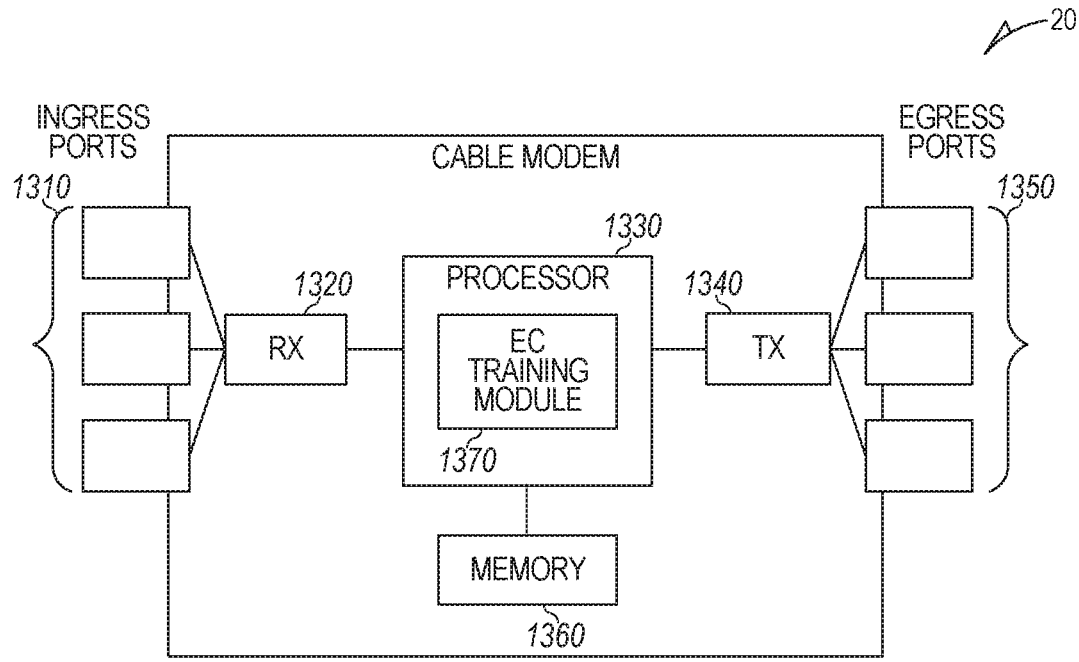
FIG. 13 is a diagram of a sample CM including an echo cancellation training module according to a sample embodiment.

FIG. 13 is a diagram of a sample CM 20 including an echo cancellation training module 1370 that comprises an echo cancellation training device according to a sample embodiment. The CM 20 is suitable for implementing the disclosed embodiments as described herein, including performing the process illustrated in FIG. 12. The CM 20 comprises ingress ports 1310 and receiver units (Rx) 1320 for receiving data; a processor, logic unit, or central processing unit (CPU) 1330 to process the data; transmitter units (Tx) 1340 and egress ports 1350 for transmitting the data; and a memory 1360 for storing the data. The CM 20 may also comprise optical-to-electrical (OE) components and electrical-to-optical (EO) components coupled to the ingress ports 1310, the receiver units 1320, the transmitter units 1340, and the egress ports 1350 for egress or ingress of optical or electrical signals.

The processor 1330 is implemented by hardware and software. The processor 1330 may be implemented as one or more CPU chips, cores (e.g., as a multi-core processor), field-programmable gate arrays (FPGAs), application specific integrated circuits (ASICs), and digital signal processors (DSPs). The processor 1330 is in communication with the ingress ports 1310, receiver units 1320, transmitter units 1340, egress ports 1350, and memory 1360. The processor 1330 includes an EC training module 1370. The EC training module 1370 implements the disclosed echo cancellation training embodiments described above and the echo cancellation functionality described with respect to FIG. 5, FIG. 6, and FIG. 12. For instance, the EC training module 1370 implements the first and second methods disclosed herein, provides training for DOCSIS, or otherwise provides various networking functions. The inclusion of the EC training module 1370 therefore provides a substantial improvement to the functionality of the CM 20 and effects a transformation of the CM 20 to a different state that facilitates full duplex communication and echo cancellation training in upstream cable channels as described herein. Alternatively, the EC training module 1370 is implemented as instructions stored in the memory 1360 and executed by the processor 1330.

The memory 1360 comprises one or more disks, tape drives, and solid-state drives and may be used as an overflow data storage device, to store programs when such programs are selected for execution, and to store instructions and data that are read during program execution. The memory 1360 may be volatile and/or non-volatile and may be read-only memory (ROM), random-access memory (RAM), ternary content-addressable memory (TCAM), and/or static random-access memory (SRAM). It will be appreciated that the memory 1360 stores instructions (e.g., software, a program, an application, an applet, an app, or other executable code) for causing the processor 1330, and hence, CM 20, to perform any one or more of the methodologies discussed herein. The instructions transform the general, non-programmed machine into a particular machine programmed to carry out the described and illustrated functions in the manner described. As used herein, the term "processor" is intended to include single or multi-core processors that may comprise two or more independent processors (sometimes referred to as "cores") that may execute instructions contemporaneously. Thus, the processor 1330 may include a single processor with a single core, a single processor with multiple cores (e.g., a multi-core processor), multiple processors with a single core, multiple processors with multiples cores, or any combination thereof.

The memory/storage 1360 may include a main memory, or other memory storage that is accessible to the processor(s) 1330 such as via a bus. The memory 1360 stores the instructions embodying any one or more of the methodologies or functions described herein. The instructions may also reside, completely or partially, within at least one of the processors 1330 (e.g., within the processor's cache memory), or any suitable combination thereof, during execution thereof by the processor 1330. Accordingly, the memory 1360 and the memory of the processor(s) 1330 are examples of machine-readable media.

In embodiments of the CM 20, the processor 1330 executes the instructions (such as the EC training module 1370) to receive an echo cancellation service ID (EC SID) assigned for Echo Cancellation Training, the EC SID being received from a cable head end in an information element (IE) in a map (MAP or P-MAP) defining a time and frequency of upstream transmission opportunities for the cable modem, the EC SID establishing when the cable modem 20 may perform echo cancellation training in a downstream channel allocated to the cable modem 20. The processor 1330 further executes the instructions to transmit an echo cancellation test signal upstream to the cable head end via an upstream channel allocated to the cable modem 20 and in a time slot specified by the received EC SID in the map. The processor 1330 further executes the instructions to measure noise in one or more downstream channels allocated to the cable modem 20, with the noise resulting from the transmission of the echo cancellation test signal on the upstream channel.

Figure 14:
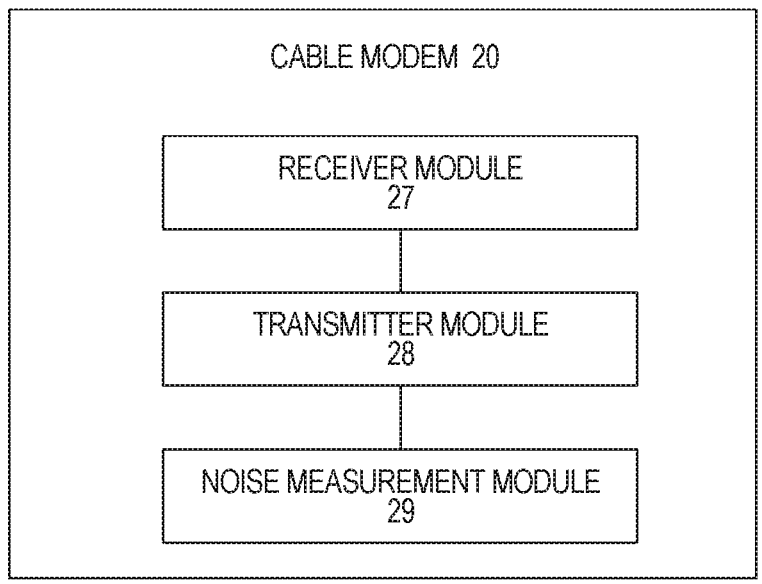
FIG. 14 is a diagram of the cable modem according to an embodiment.

FIG. 14 is a diagram of the cable modem 20 according to an embodiment. In this embodiment, the cable modem 20 includes a receiver module 27 receiving an echo cancellation service ID (EC SID) assigned for echo cancellation training, the cable modem receiving the EC SID from a cable head end in an information element (IE) in a map (MAP or P-MAP) defining a time and frequency of upstream transmission opportunities for the cable modem, the EC SID establishing when the cable modem may perform echo cancellation training in a downstream channel allocated to the cable modem, a transmitter module 28 transmitting an echo cancellation test signal upstream to the cable head end via an upstream channel allocated to the cable modem and in a time slot specified by the received EC SID in the map, and a noise measurement module 29 measuring noise in one or more downstream channels allocated to the cable modem, with the noise resulting from the transmission of the echo cancellation test signal on the upstream channel. In some embodiments, the cable modem 20 may include other or additional modules for performing any one of or combination of steps described in the embodiments. Further, any of the additional or alternative embodiments or aspects of the method, as shown in any of the figures or recited in any of the claims, are also contemplated to include similar modules.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors 1330, such that the instructions, when executed by one or more processors 1330 cause the one or more processors 1330 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

Those skilled in the art will appreciate that the full duplex DOCSIS EC training system described herein provides technical advantages over conventional full duplex DOCSIS systems. For example, by using the echo cancellation information element described herein, the CMTS 10 is able to grant EC training transmission opportunities for the CMs 20 to do the EC training and to instruct a CM 20 or multiple CMs 20 when to perform the EC training. The EC training SID described herein enables the CMTS 10 to grant the transmission opportunities to the CMs 20. The newly created EC training SID also can be part of a DOCSIS MAP information element to be used by a CM 20 to send an EC test signal in the allocated mini-slots addressed by the DOCSIS MAP or P-MAP in the upstream direction. The CM 20 will then be enabled to measure the echo or signal leakage made to its downstream channels and to provide the appropriate compensation for upstream transmissions from the CM 20 to the CMTS 10.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An echo cancellation training method in a cable modem, comprising:
   receiving an echo cancellation service ID (EC SID) assigned for echo cancellation training, the cable modem receiving the EC SID from a cable head end in an information element (IE) in a map (MAP or P-MAP) defining a time and frequency of upstream transmission opportunities for the cable modem, the EC SID establishing when the cable modem may perform the echo cancellation training in a downstream channel allocated to the cable modem;
   transmitting an echo cancellation test signal upstream to the cable head end via an upstream channel allocated to the cable modem and in a time slot specified by the received EC SID in the map; and
   measuring noise in one or more downstream channels allocated to the cable modem, with the noise resulting from the transmission of the echo cancellation test signal on the upstream channel.

2. The method of claim 1, wherein the EC SID is provided in a reserved information element (IE) entry of the MAP or the P-MAP.

3. The method of claim 2, further comprising the cable modem extracting the EC SID from the MAP or the P-MAP to identify the time slot for the transmission of the echo cancellation test signal.

4. The method of claim 1, wherein the EC SID is provided in a dedicated information element (IE) entry added to the MAP or the P-MAP.

5. The method of claim 4, further comprising the cable modem extracting the EC SID from the MAP or the P-MAP to identify the time slot for transmission of the echo cancellation test signal.

6. The method of claim 1, wherein the cable modem further receives a resource block assignment (RBA) assigning the upstream channel to the cable modem.

7. The method of claim 1, wherein the cable modem further receives a resource block assignment (RBA) assigning the one or more downstream channels to the cable modem.

8. The method of claim 1, wherein the cable modem receives a same RBA as other cable modems in a transmission group.

9. The method of claim 1, with the cable modem capable of full duplex communications over a transmission line to a cable head end, wherein the transmission line has at least one downstream communication channel and at least one upstream communication channel allocated to the cable modem.

10. A cable modem, comprising:
    a memory storage comprising instructions; and
    a processor in communication with the memory, wherein the processor executes the instructions to:
    receive an echo cancellation service ID (EC SID) assigned for echo cancellation training, the EC SID being received from a cable head end in an information element (IE) in a map (MAP or P-MAP) defining a time and frequency of upstream transmission opportunities for the cable modem, the EC SID establishing when the cable modem may perform the echo cancellation training in a downstream channel allocated to the cable modem;

transmit an echo cancellation test signal upstream to the cable head end via an upstream channel allocated to the cable modem and in a time slot specified by the received EC SID in the map; and measure noise in one or more downstream channels allocated to the cable modem, with the noise resulting from the transmission of the echo cancellation test signal on the upstream channel.

11. The cable modem of claim 10, wherein the SEC IDEC SID is provided in a reserved information element (IE) entry of the MAP or the P-MAP.

12. The cable modem of claim 11, wherein the cable modem extracts the EC SID from the MAP or the P-MAP to identify the time slot for the transmission of the echo cancellation test signal.

13. The cable modem of claim 10, wherein the EC SID is provided in a dedicated information element (IE) entry added to the MAP or the P-MAP.

14. The cable modem of claim 13, wherein the cable modem extracts the EC SID from the MAP or the P-MAP to identify the time slot for transmission of the echo cancellation test signal.

15. The cable modem of claim 10, wherein the cable head end provides a resource block assignment (RBA) assigning the upstream channel to the cable modem.

16. The cable modem of claim 10, wherein the cable modem further receives a resource block assignment (RBA) assigning the one or more downstream channels to the cable modem.

17. The cable modem of claim 10, wherein a plurality of cable modems in a transmission group receive a same RBA.

18. The cable modem of claim 10, with the cable modem capable of full duplex communications over a transmission line to a cable head end, wherein the transmission line has at least one downstream communication channel and at least one upstream communication channel allocated to the cable modem.

19. A non-transitory computer-readable media storing computer instructions implementing full-duplex communications in a cable modem, that when executed by one or more processors, cause the one or more processors to perform the steps of:

receiving an echo cancellation service ID (EC SID) assigned for echo cancellation training, the EC SID being received from a cable head end, the EC SID being received in an information element (IE) in a map (MAP or P-MAP) defining a time and frequency of upstream transmission opportunities for the cable modem, the EC SID establishing when the cable modem may perform the echo cancellation training in a downstream channel allocated to the cable modem;

transmitting an echo cancellation test signal upstream to the cable head end via an upstream channel allocated to the cable modem and in a time slot specified by the received EC SID in the map; and measuring noise in one or more downstream channels allocated to the cable modem, with the noise resulting from the transmission of the echo cancellation test signal on the upstream channel.

\* \* \* \* \*

UNITED STATES PATENT AND TRADEMARK OFFICE
CERTIFICATE OF CORRECTION

PATENT NO. : 10,763,915 B2
APPLICATION NO. : 15/988746
DATED : September 1, 2020
INVENTOR(S) : Sun et al.

Page 1 of 1

It is certified that error appears in the above-identified patent and that said Letters Patent is hereby corrected as shown below:

On the Title Page

Item (56), in Column 2, under "Other Publications", Line 1, delete "Specification" and insert --Specifications-- therefor Item (57), in "Abstract", in Column 2, Line 1, delete "modern" and insert --modem-- therefor In the Claims In Column 15, Line 11, in Claim 11, delete "SEC IDEC SID" and insert --EC SID-- therefor Signed and Sealed this
Twenty-fourth Day of November, 2020

Andrei Iancu
*Director of the United States Patent and Trademark Office*